United States Patent
Carroll et al.

(10) Patent No.: US 9,123,153 B2
(45) Date of Patent: Sep. 1, 2015

(54) SCALABLE MULTI-PRIMITIVE SYSTEM

(75) Inventors: Jason Carroll, Oviedo, FL (US); Vineet Goel, Winter Park, FL (US); Mangesh Nijasure, Orlando, FL (US); Todd E. Martin, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 603 days.

(21) Appl. No.: 13/477,808

(22) Filed: May 22, 2012

(65) Prior Publication Data

US 2013/0169635 A1   Jul. 4, 2013

Related U.S. Application Data

(60) Provisional application No. 61/581,702, filed on Dec. 30, 2011.

(51) Int. Cl.
| | |
|---|---|
| *G06T 15/30* | (2011.01) |
| *G06T 11/20* | (2006.01) |
| *G09G 5/00* | (2006.01) |
| *G06F 15/80* | (2006.01) |
| *G06T 17/00* | (2006.01) |
| *G06T 15/00* | (2011.01) |
| *G06T 17/20* | (2006.01) |

(52) U.S. Cl.
CPC ............... *G06T 15/005* (2013.01); *G06T 17/20* (2013.01)

(58) Field of Classification Search
CPC .......... G06T 15/00; G06T 1/20; G06T 15/80; G06T 2210/32; G06T 17/20; G06T 1/60
USPC .................................................. 345/323, 441
See application file for complete search history.

(56) References Cited

U.S. PATENT DOCUMENTS

| | | | |
|---|---|---|---|
| 2005/0195188 A1* | 9/2005 | Goel et al. ..................... 345/423 |
| 2011/0090220 A1* | 4/2011 | Molnar et al. ................ 345/420 |
| 2011/0102448 A1* | 5/2011 | Hakura et al. ................ 345/581 |
| 2012/0019541 A1 | 1/2012 | Goel et al. |

* cited by examiner

*Primary Examiner* — Devona Faulk
*Assistant Examiner* — Nicole Gillespie
(74) *Attorney, Agent, or Firm* — Volpe and Koenig, P.C.

(57) ABSTRACT

Disclosed herein is a vertex core. The vertex core includes a reset scanner configured to remove reset indices and partial primitives in an input stream and resolve draw calls into sub-draw calls at reset index boundaries; and provide the resolved sub-draw calls to a plurality of downstream vertex grouper tessellators.

16 Claims, 9 Drawing Sheets

| Name: | Bits: | Description: |
|---|---|---|
| IA_VGT_data_index | 256 | Index data. 8 32 bit index values |
| IA_VGT_data_lsw | 4 | Indicates the least significant word for valid indices in the data stream |
| IA_VGT_data_msw | 4 | Indicates the most significant word for valid indices in the data stream |

FIG. 6

| Name: | Bits: | Description: |
|---|---|---|
| IA_VGT_cmd_num_indices | 32 | Indicates the number of indices in the sub draw call. Controls how many primitives will be generated by the grouper in the VGT |
| IA_VGT_cmd_transfer_type | 3 | 0 – Draw command with Major Mode 0 (except draw opaque/auto call)<br>1 – Draw command with Major Mode 1<br>2 – Draw Opaque/Auto call<br>3 – Event<br>4 – State transfer for VGT_MIN_VTX_INDX<br>5 – State transfer for VGT_MAX_VTX_INDX<br>6 – State transfer for VGT_INDX_OFFSET |
| IA_VGT_cmd_index_type | 1 | Indicates 16 or 32 bit indices |
| IA_VGT_cmd_prim_type | 5 | Has the primitive type from the original draw cAll |
| IA_VGT_cmd_first_prim | 1 | Indicates the first prim for DI_PT_POLYGON to set correct edge flags |
| IA_VGT_cmd_last_prim | 1 | Indicates the last prim for DI_PT_POLYGON to set correct edge flags |
| IA_VGT_cmd_state_sel | 3 | Indicates state select for the original draw call |
| IA_VGT_cmd_primid_base | 32 | This is the primid for the first primitive in the sub draw call. The VGT will enumerate the rest of the primitives based on this |
| IA_VGT_cmd_aux_data | 32 | Carries extra index information for certain primitive types:<br>DI_PT_TRISTRIP_ADJ, DI_PT_TRIFAN, DI_PT_POLYGON |
| IA_VGT_cmd_odd | 1 | Indicates whether the first prim the sub draw call is an odd primitive. This is used to set the winding order. |
| IA_VGT_cmd_eoi | 1 | Indicates end of instance |
| IA_VGT_cmd_eopg | 1 | Indicates end of primgroup |
| IA_VGT_cmd_eop | 1 | Indicates end of packet |
| IA_VGT_cmd_hgp | 1 | Indicates that this transfer is for a high priority graphics draw call |

FIG. 7

SCALABLE MULTI-PRIMITIVE SYSTEM

CROSS REFERENCE TO RELATED APPLICATIONS

This application claims the benefit of U.S. Provisional Application No. 61/581,702, filed on Dec. 30, 2011, which is incorporated herein by reference in its entirety.

BACKGROUND

1. Field

The present invention is generally directed to computing operations performed in a computing system. More particularly, the present invention relates to computing operations performed by a processing unit (e.g., a graphics processing unit (GPU)) in a computing system.

2. Background Art

Display images are comprised of thousands of dots, where each dot represents one of thousands or millions of colors. These dots are known as picture elements, or "pixels". Each pixel has multiple attributes associated with it, including a color and a texture which is represented by a numerical value stored in the computer system. A three dimensional (3D) display image, although displayed using a two dimensional (2D) array of pixels, may in fact be created by rendering a plurality of graphical objects.

Examples of graphical objects include points, lines, polygons, and 3D solid objects. Points, lines, and polygons represent rendering primitives (aka "prims") which are the basis for most rendering instructions. More complex structures, such as 3D objects, are formed from a combination or mesh of such primitives. To display a particular scene, the visible primitives associated with the scene are drawn individually by determining those pixels that fall within the edges of the primitives, and obtaining the attributes of the primitives that correspond to each of those pixels.

The inefficient processing of these primitives reduces system performance in rendering complex scenes, for example, to a display. For example, in most graphics systems, primitives are processed serially, which significantly slows the rendering of complex scenes.

An additional challenge is that most input index streams (e.g., input indices), created in the production of primitives are not formatted in a manner that is ideal for processing by the multiple primitive generation units that reside in conventional graphics systems. Consequently, these input indices are not amenable for scalable primitive generators.

SUMMARY OF EMBODIMENTS

What is needed, therefore, are systems and methods to more efficiently process primitives. What is also needed are scalable methods and systems capable of higher primitive rates (e.g., greater than 2 primitives per clock), capable of processing multiple primitives simultaneously, The present invention meets the above-described needs by providing methods, apparatuses, and systems for efficiently processing video data in a processing unit.

For example, an embodiment of the present invention provides, under certain circumstances, a vertex core. The vertex core includes a reset scanner (RS) included within an input assembler. The RS processes incoming indices and removes any reset indices and partial primitives in an input stream. The RS can break up original draw calls at reset index boundaries as well as user specified prim group boundaries. The resulting sub draw calls are reset index and partial primitive free and are then forwarded to downstream vertex grouper tessellators (VGTs). This logic processes incoming primitives at the desired system throughput, faster than the downstream blocks.

Primitive generation logic is performed in a VGT and is thus replicated as many times as the desired primitives per clock. For example, this logic can operate at 1 prim/clock and its design is simpler because it does not need to associate with reset indices.

Input index streams are not ideal for processing by multiple primitive generation units. In contrast, embodiments of the invention provide an approach that transforms input indices into a format amenable for scalable primitive generators. This allows architectures capable of scalable and higher primitive rates (greater than two primitives per clock).

Embodiments of the present invention enable scaling the system to support architectures with multiple primitives per clock with minimal re-design. Pre-processing the index stream to remove reset indices and partial primitives enables the downstream primitive generators to be simple and cost efficient since they become smaller in size. These units are multiplied in architectures with higher primitive rates and performance and cost savings are increased.

An embodiment of the invention includes a plurality of VGTs capable of operating in parallel. In the embodiment, each VGT includes an input FIFO (i.e., first in first out module) and a grouper module. The plurality of VGTs interface with the IA. The IA further includes an RS. The remaining functionality of the VGT (e.g., vertex reuse, pass-through, etc.) is mirrored in two or more separate VGT modules. This mirroring enables the creation of multiple identical shader core paths operating in parallel, each path processing one primitive during a single clock period.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIGS. 6 and 7 illustrate example input assembler and vertex group tessellator parameters, according to an embodiment of the present invention;

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Embodiments of the present invention provide a processing unit that enables the execution of video instructions and applications thereof. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1A:
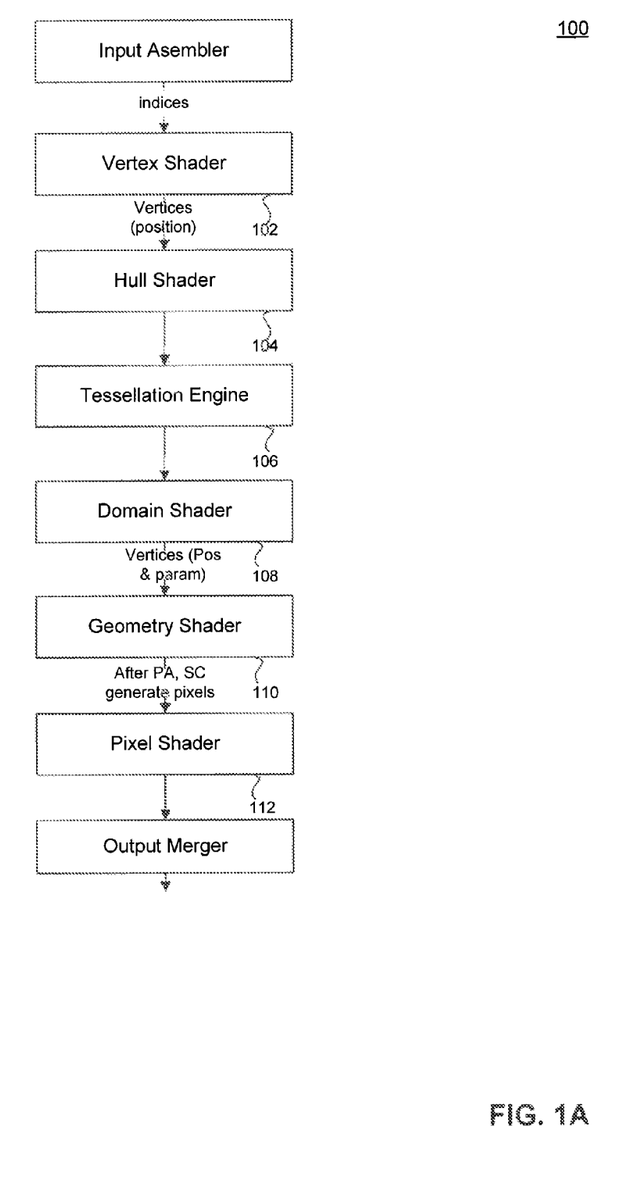
FIG. 1A is a graphics render pipeline in accordance with an embodiment of the present invention.

FIG. 1A is a graphics render pipeline 100 within a processor, such as a GPU, in accordance with an embodiment of the present invention. Pipeline 100 includes a vertex core 102, a hull shader 104, a tessellation engine 106, a domain shader 108, a geometry shader 110, and a pixel shader 112. One skilled in the relevant arts will appreciate that other combinations of the shader functionality shown in FIG. 1 are contemplated within the scope of the present invention. Moreover, individual shader stages are generally optional, and their execution can be bypassed in an exemplary embodiment.

Each shader in pipeline 100 comprises computer program logic that performs a set of operations for graphics rendering on graphics hardware. Shaders are typically compact programs with a particular goal in mind (e.g., vertex manipulation, geometry manipulation, pixel manipulation, etc.). For example, vertex core 102 would typically be configured to run once per vertex in a 3D model, applying effects such as transformations to change the location of the vertex, or per-vertex lighting.

Pixel shader 112 similarly operates on a per-pixel basis. A pixel shader 112 would typically be configured to apply effects such as interpolation and anisotropic filtering. It can also apply color or brightness effects.

Vertex shaders and pixel shaders, and more recently geometry shaders, are in common use in high end 3D graphics applications. These shader stages are available in Microsoft® Direct3D 10, and allow for basic tessellation functionality via geometry shader 110.

With the introduction of Microsoft® Direct3D 11, three new pipeline stages that work together to implement tessellation were made available. Two of these three stages are shader stages, specifically the hull shader 104 and domain shader 108. Between these shader stages is a tessellator stage, with fixed tessellation behavior. The tessellator stage is not implemented in a shader in the Microsoft® Direct3D 11 specification, but is rather a fixed implementation.

The hull shader 104 operates on a per-control point basis, in accordance with an embodiment of the present invention. Control points that define a low-order surface (e.g., a triangle) are accepted as an input, and the hull shader 104 provides a new set of control points that define a patch. There is a separate portion of hull shader 104 that operates on a per-patch basis to generate per-patch constants used for tessellation (e.g., edge tessellation factors).

The tessellator stage is a fixed-function stage that performs actual subdivision of a patch provided by hull shader 104 into smaller primitives (e.g., triangles, points, lines). It operates once per patch, and provides a new set of points to the domain shader 108. Domain shader 108 operates on a per-point basis (output points from the tessellator stage) to obtain vertex positions for the points.

Figure 1B:
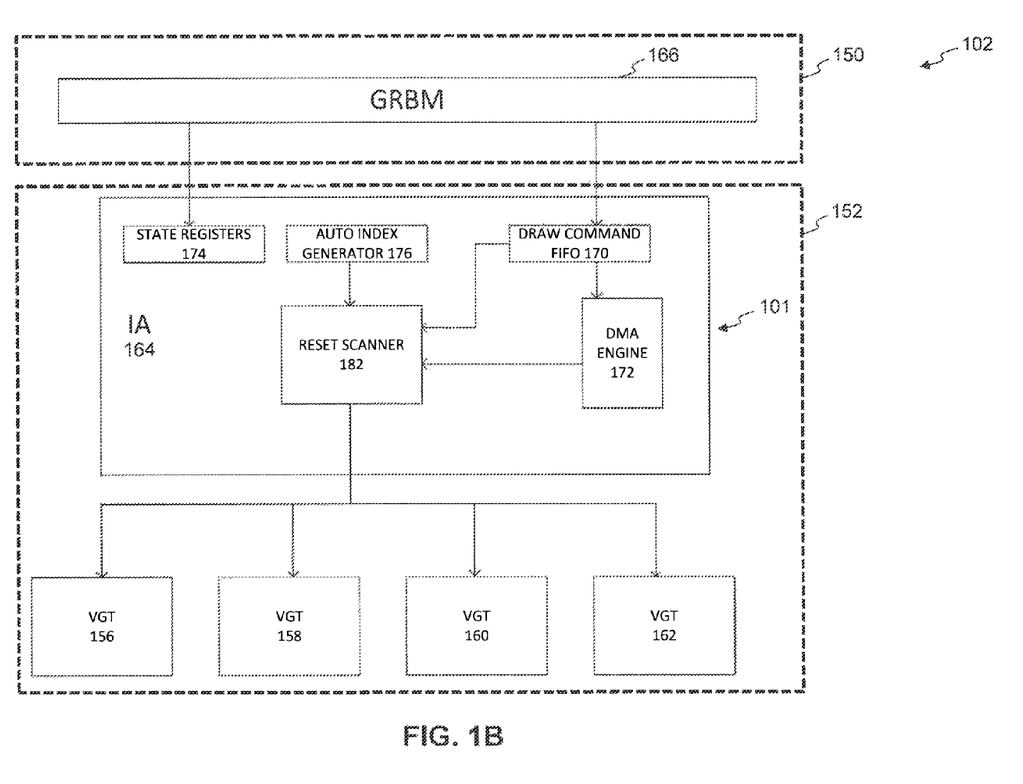
FIG. 1B is a block diagram illustration of a vertex core constructed in accordance with an embodiment of the present invention.

FIG. 1B is block diagram illustration vertex core 102 of FIG. 1B above. Vertex core 102 includes a first processing section 150 includes a graphics register bus manager (GRBM) 166. A second processing section 152 includes the IA 164 and VGTs, 156, 158, 160, and 162.

As noted above, in one embodiment of the present invention, an RS is included within an IA. The RS processes incoming indices and removes any reset indices and partial primitives in an input stream. The RS can break up original draw calls at reset index boundaries as well as user specified prim group boundaries. In an embodiment, the resulting sub draw calls are reset index and partial primitive free and are then forwarded to the downstream VGTs. This logic processes incoming primitives at the desired system throughput, faster than downstream blocks.

In an embodiment, primitive generation logic is moved into each VGT and is thus replicated as many times as the desired primitives per clock. For example, this logic operates at 1 prim/clock and its design is simpler because it does not have to handle reset indices which have been removed upstream by the RS. These aspects will be addressed more fully below.

The GRBM 166 sends VGT state register data to the IA 164 and the VGTs 156-162. Each of the IA 164, the VGTs 156-162 keeps its own set of multi-context registers and single context registers, relevant to its particular function. Within IA 164, an immediate data register can be provided for processing immediate data and performing auto-indexing. A direct memory access (DMA) engine 172 is included for processing DMA indices. IA 164 includes a draw command FIFO 170 for processing draw calls. In addition, IA 164 includes state registers 174 and auto index generator 176. An example operation of state registers 174 and auto index generator 176 is further described in U.S. patent application Ser. No. 12/839,965, entitled "Multi-Primitive System," which is incorporated by reference herein in its entirety.

The IA 164 is merely one exemplary implementation of an input assembler, constructed in accordance with an embodiment of the present invention. The present invention, however, is not limited to this example, as will be appreciated more fully in the discussions that follow.

Figure 2:
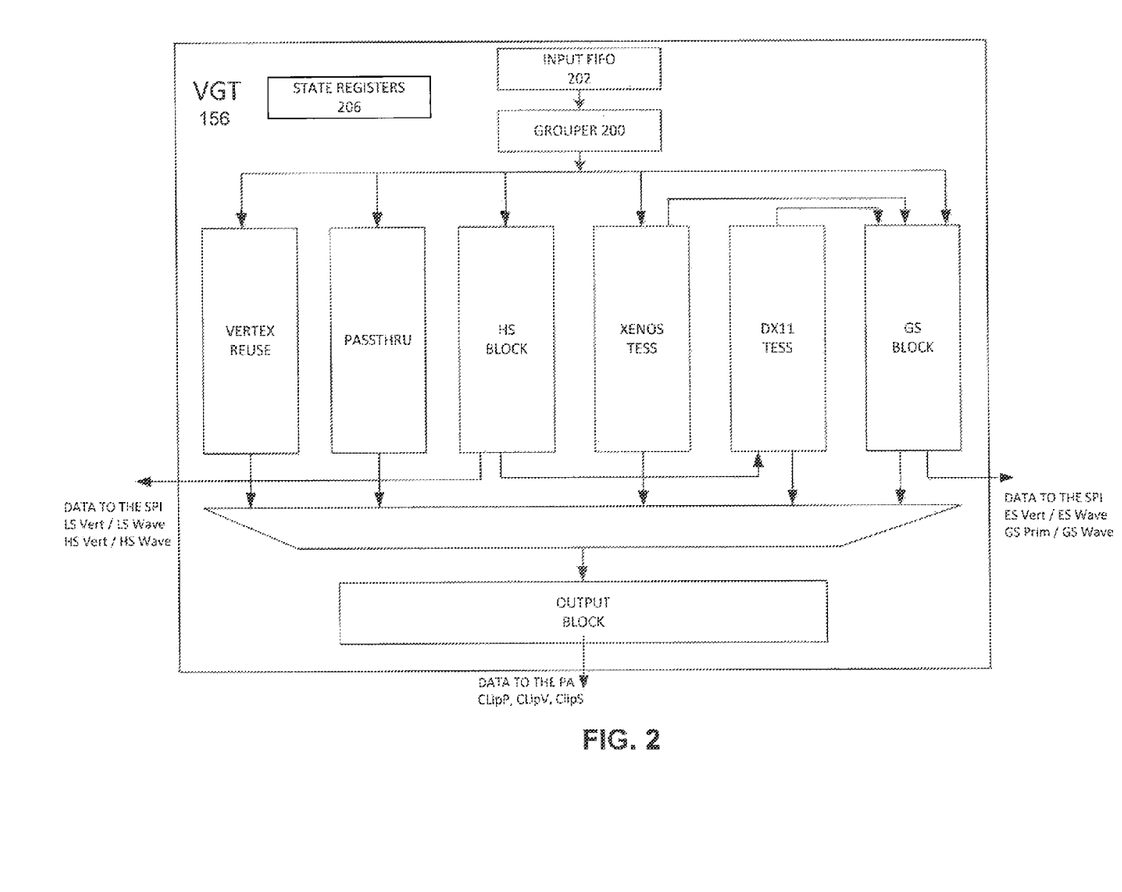
FIG. 2 is a more detailed illustration of the VGT shown in FIG. 1B.

FIG. 2, is an exemplary block diagram illustration depicting VGT 156 of FIG. 1B, in greater detail. As shown in FIG. 2, VGT 156 includes grouper module 200. In the exemplary embodiment of FIG. 2, grouper 200 is configured to receive and process multiple regular primitives during one clock period, simultaneously. The present invention, however, is not limited to this configuration. VGT 156 also includes input FIFO 202 and VGT state registers 206, as well as additional functional modules (e.g., vertex reuse, pass-through, etc.). The functionality of VGT 156 is mirrored in remaining VGTs 158-162, of FIG. 1B.

As noted above, grouper 200 plays a key role in enabling vertex core 102 to process multiple primitives per clock. Embodiments of the present invention can include N# of shader engines to process N primitives per clock simultaneously.

In the embodiment, RS 182 distributes incoming draw calls to the multiple VGTs 156-162. An index stream output from RS 182 is desirably free of reset indices and partial primitives. This index stream simplifies the processing within the VGT groupers (e.g., VGT 200) and enables each grouper to assemble primitives, for example, at a rate of 1 prim/clock.

RS 182 scans the incoming indices and creates sub-draw call 'cmd' information for VGTs 156-162. The number of primitives associated with each VGT is user programmable and are controllable via a register.

In the embodiment, if reset indices are detected, RS 182 removes these indices and breaks up the sub draw call at the reset index boundary. RS 182 also removes partial primitives from the index stream that typically occur at an end of instances.

The examples below are illustrations of this basic operation, assuming the following parameters:

(a) 4 VGTs (desired rate is 4 primitives/clock)

(b) Primgroup Size=2 (number of primitives to send to a VGT before switching VGTs)

(c) Number of indices read simultaneously=8 (input index read/process rate of the RS)

(d) Primitive Type=Triangle Strip (primitive type for the draw call)

Figure 3:
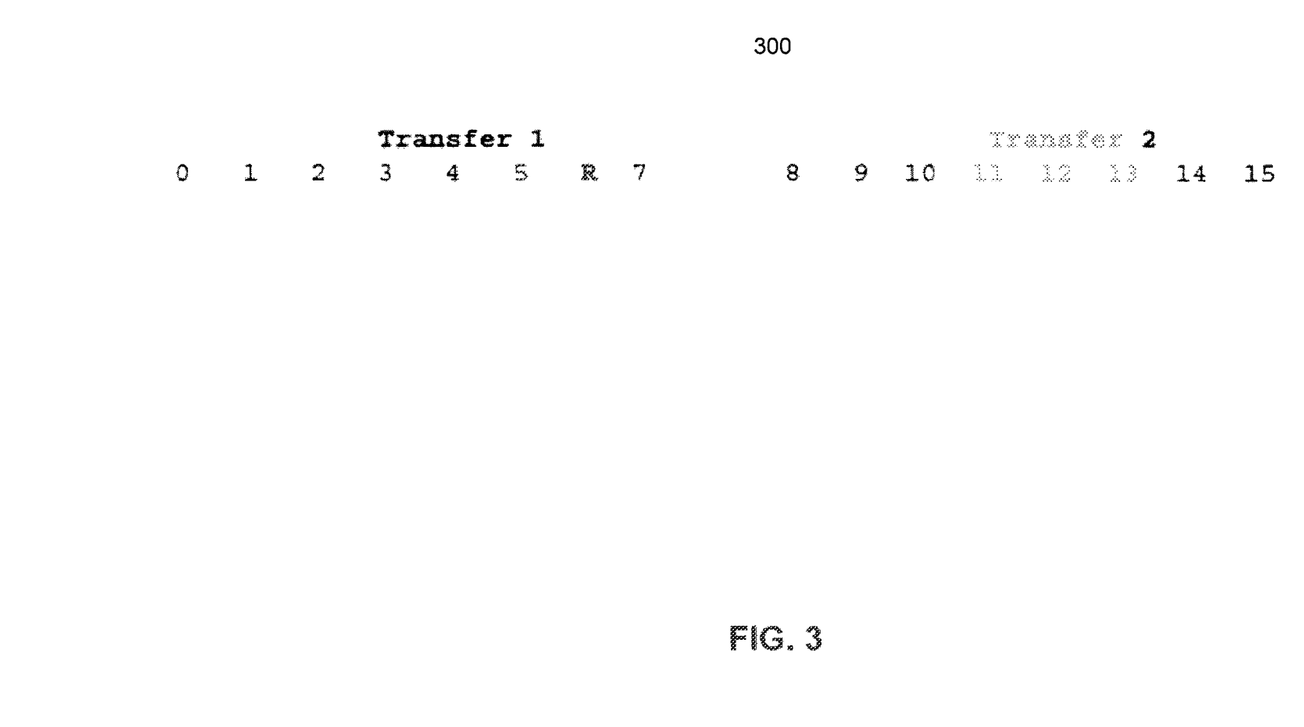
FIG. 3 illustrates example input streams.

FIG. 3 is an exemplary illustration of input stream 300 including a transfer 1 stream section and transfer 2 stream section. In Transfer 1 stream section, 'R' indicates a reset index.

In the example of FIG. 3, the primgroup size is 2. Therefore, 2 prims will be forwarded to each of the VGTs 156-162. With triangle strips as the primitive type, this would result in the output illustrated in FIG. 4.

Figure 4:
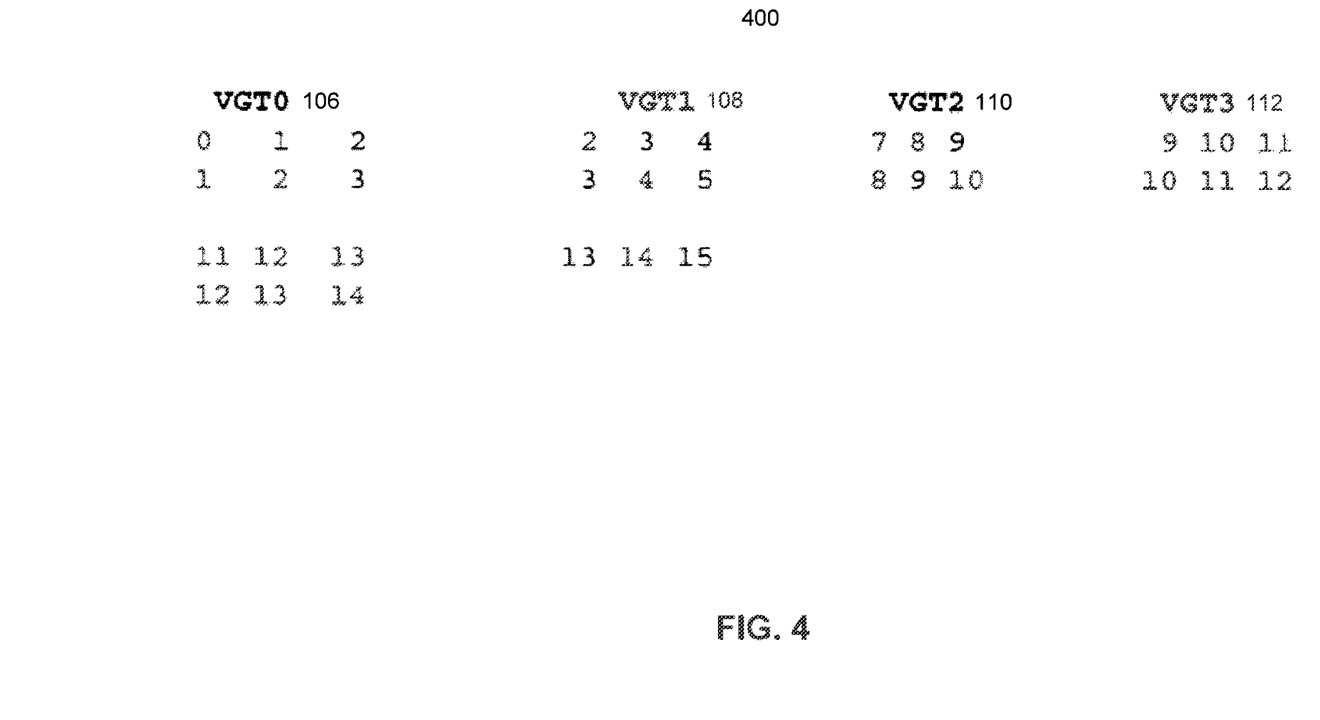
FIG. 4 illustrates an example output using the input stream of FIG. 3, according to an embodiment of the present invention.

FIG. 4 is an exemplary illustration 400 of output streams associated with each of VGT's 156-162 produced in response to input stream 300 illustrated in FIG. 3.

In an embodiment, RS 182 is responsible for dropping (or removing) all primitives that include reset indices. From the example of FIG. 3, these were:

4 5 R, 5 R 7, and R 7 8

Figure 5:
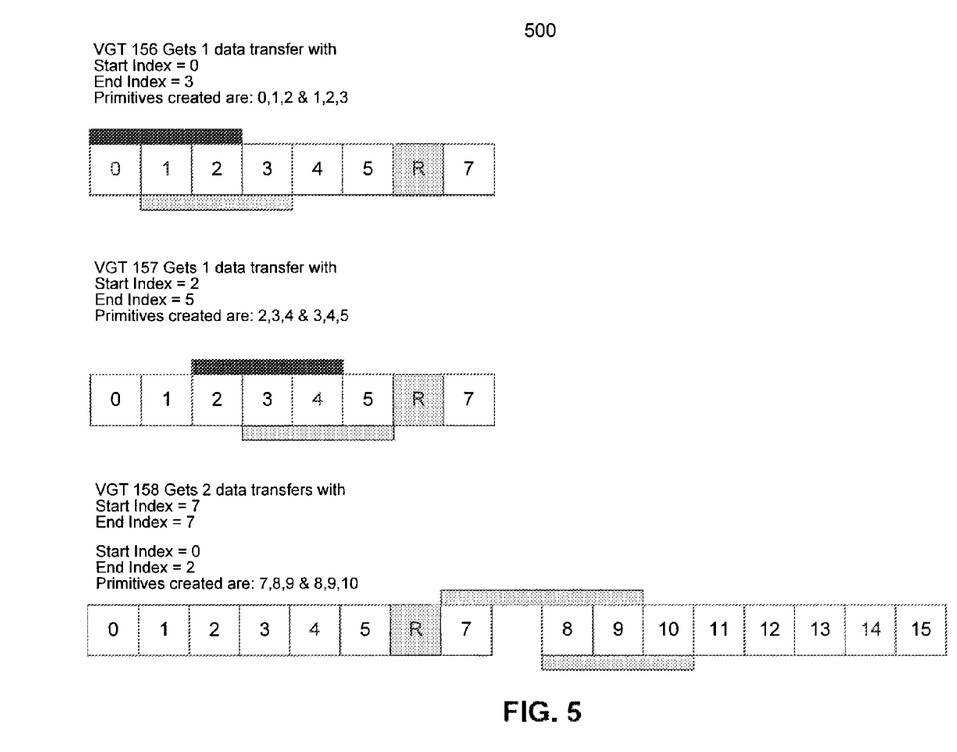
FIG. 5 illustrates creation of "data" and "cmd" information by an RS for the example of FIG. 3, according to an embodiment of the present invention.

FIG. 5 depicts a process 500 creating "data" and "cmd" information by an RS, such as RS 182, for the example of FIG. 3, according to an embodiment of the present invention. By way of example, FIG. 5 illustrates different start and end indices and primitives that are created in accordance with respective start and end indices, using VGTs 156, 157, and 158.

In FIG. 5, for example, VGT 156 receives one data transfer for primitive creation. The data transfer to VGT 156 has a start index of "0" and an end index of "3." In this manner, primitives 0, 1, 2 & 1, 2, and 3 are created. In the example process 500 of FIG. 5, This process is repeated, as illustrated, for VGTs 157 and 158.

In an embodiment, at each end of instance (EOI), RS 182 will send a null "EOI" to all the other VGTs 156-162. As a non-limiting example, and with reference to FIG. 5, such a null "EOI" may be sent by RS 182 after a VGT (e.g., VGT 156) creates a set of primitives (e.g., primitives 0, 1, 2 and 1, 2, 3). The current VGT (e.g., VGT 157) will receive a transfer on the "cmd" with EOI set. This process enables each of VGTs (e.g., VGTs 156-162) to independently increment the instance id. In the embodiment, each VGT has an independent vertex id counter. To handle primitive id, the cmd carries the primitive id of the first primitive in the associated cmd transfer. The VGT grouper (e.g., grouper 200) increments this primitive id for all the primitives in the cmd.

Index offset and clamping is performed in each of VGTs 156-162. In the embodiment, RS 182 transfers state information for MIN_VTX_INDX, MAX_VTX_INDX and INDX_OFFSET over a cmd interface. In an embodiment, each VGT 156-162 will keep a copy of these three values to perform the offset and clamping.

In an embodiment, pipeline stats (query counts) for the number of input primitives and vertices are computed by the RS 182 and sent from the IA 164 to the command processor.

In an embodiment, draw opaque/auto draw calls are handled like all other draw calls with the exception that the transfer type indicates a draw opaque call. This allows a VGT to bypass the index offset and clamping logic since this is not needed.

In an embodiment, a mode is also supported where the entire draw call can be dispatched to a single VGT instead of splitting it up. This mode can be user controlled. In this mode, RS 182 will still create multiple 'cmd' transfers which will be broken up (or resolved) based on the PRIMGROUP_SIZE register programming, but the VGT will not increment. In an embodiment, this operation is necessary since reset scanning is still supported and there may not be enough space to buffer up all the indices for large draw packets.

In an embodiment, RS 182 processes point sprites as normal points. The VGT looks up state to determine whether sprites are enabled. In an embodiment, if they are enabled, the primitive generation logic will create two triangles with the appropriate winding order.

To handle DI_PT_TRIFAN, the aux data contains the first index of the fan. The grouper will store this information for the entire cmd transfer and will use this as the first index for the triangles created in the fan. The same aux data concept is used to generate DI_PT_POLYGON.

In addition to this, the cmd transfer has an indication if it contains the first_prim and the last_prim of the polygon. This allows the grouper to set the edge flags correctly. Polygon primitives only have edge flags set on the outer edges. The aux data transfer is also used for DI_PT_TRISTRIP_ADJ to substitute indices. When processing DI_PT_LINELOOP, RS 182 adds the initial index onto the index stream at the very end; so that it appears to be a normal line strip to grouper 200.

Figure 6:
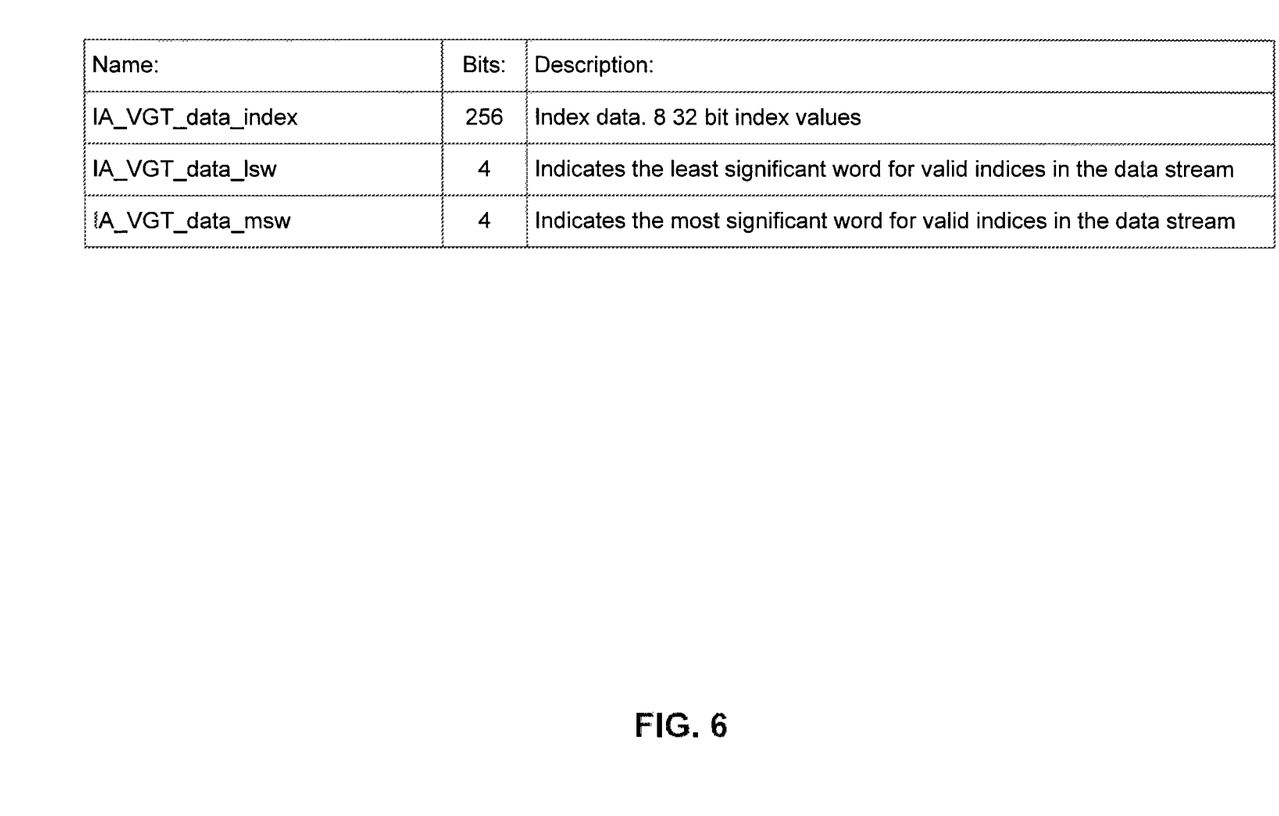

In an embodiment, information needed by each VGT to generate primitives is passed across from the IA in two separate entities, namely:

(1) IA_VGT_data—The data portion of the transfer carries the index information which is tagged with first and last valid index markers. Example IA_VGT_data parameters are further illustrated in FIG. 6.

(2) IA_VGT_cmd—The cmd interface carries descriptions of the broken up draw initiator which will tell the VGT how many indices are in the sub draw call along with other control parameters to process the 'data' and create primitives. Example IA_VGT_cmd parameters are further illustrated in FIG. 7.

Embodiments of the present invention enable scaling the system to support architectures with multiple primitives per clock with minimal re-design. Pre-processing the index stream to remove reset indices and partial primitives enables the downstream primitive generators to be simple and cost efficient since they become smaller. These units are multiplied in architectures with higher primitive rates and performance and cost savings are increased.

Figure 8:
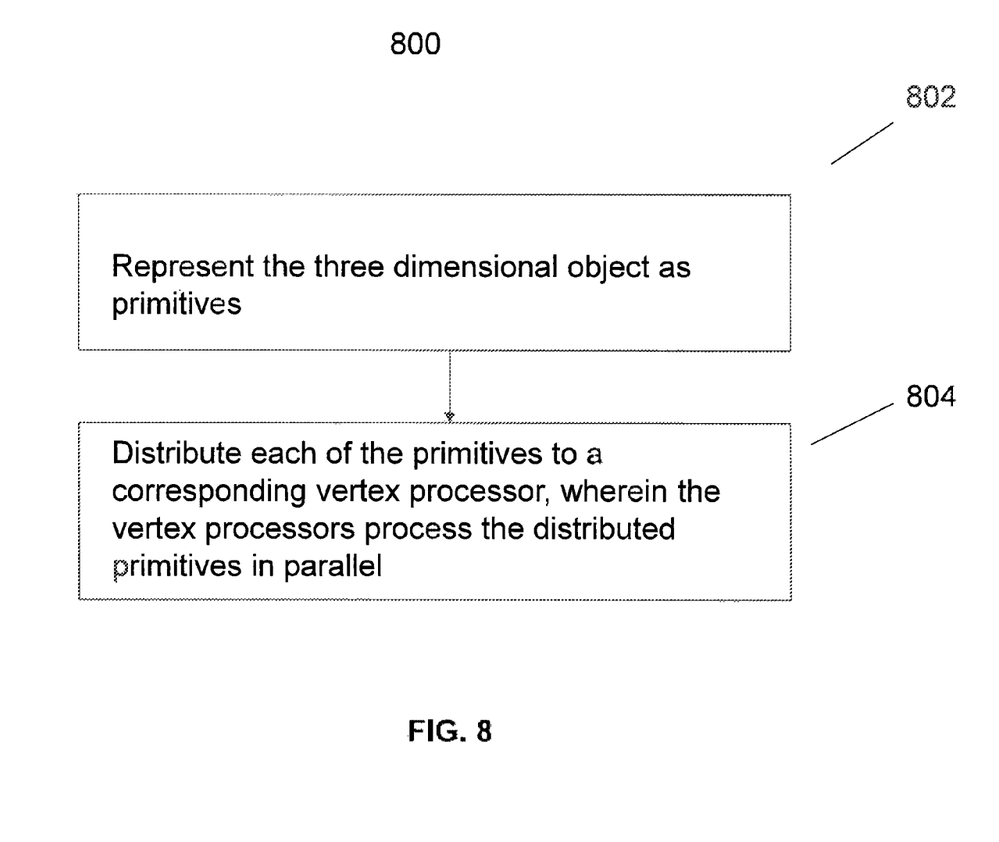
FIG. 8 is a flowchart of an exemplary method for converting three dimensional objects into two dimensional coordinates within a graphics system.

FIG. 8 is a flowchart of an exemplary method 800 for converting three dimensional objects into two dimensional coordinates within a graphics system. In the method 800, a three dimensional object is represented as primitives in step 802. In a step 804, each of the primitives is distributed to a corresponding vertex processor, wherein the vertex processors process the distributed primitives in parallel.

Embodiments of the present invention can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits. It also understood that the functions accomplished and/or structure provided by the systems and techniques described above can be represented in a user written shader that is run as a pre-process on a GPU.

Disclosed above are processing units for processing multiple primitives in a graphics system, and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A vertex core, comprising:
   a reset scanner configured to:
      remove reset indices and partial primitives in an input stream;
      resolve draw calls into sub-draw calls at reset index boundaries, wherein the sub-draw calls are reset index and partial primitive free; and
      provide the resolved sub-draw calls to a plurality of downstream vertex grouper tessellators (VGTs),
   wherein the VGTs are configured to respectively receive a plurality of primitives in parallel.

2. The vertex core of claim 1, wherein the reset scanner is configured resolve the draw calls at user specified primitive group boundaries.

3. The vertex core of claim 1, wherein primitive generation logic is performed in a VGT.

4. The vertex core of claim 1, wherein the reset scanner is included in an input assembler.

5. The vertex core of claim 4, wherein the input assembler further comprises an automatic index generator, a draw command first in first out queue and a direct memory access engine.

6. The vertex core of claim 1, wherein the primitive generation logic is performed in each VGT and replicated as the same number of times as a desired primitives per clock.

7. A method of converting three dimensional objects into two dimensional coordinates within a computer system, comprising:
   removing reset indices and partial primitives in an input stream;
   resolving draw calls into sub-draw calls in the input stream at reset index boundaries, wherein the sub-draw calls are reset index and partial primitive free; and
   providing the resolved sub-draw calls to a plurality of downstream vertex processors,
   wherein the vertex processors are configured to respectively receive a plurality of primitives in parallel.

8. The method of claim 7, wherein the primitives are processed in parallel during a single clock period.

9. The method of claim 8, wherein each primitive includes multiple portions, each portion being associated with a respective one of the vertex processors.

10. The method of claim 7, further comprising: resolving the draw calls at user specified prim group boundaries.

11. The method of claim 7, further comprising performing primitive generation in a vertex grouper tessellator.

12. A non-transitory computer readable media storing instructions wherein said instructions when executed are adapted to convert three dimensional objects into two dimensional coordinates within a graphics system including multiple vertex processors, with a method comprising:
   removing reset indices and partial primitives in an input stream;
   resolving draw calls into sub-draw calls in the input stream at reset index boundaries, wherein the sub-draw calls are reset index and partial primitive free; and
   providing the resolved sub-draw calls to a plurality of downstream vertex grouper tessellators (VGTs),
   wherein the VGTs are configured to respectively receive a plurality of primitives in parallel.

13. The non-transitory computer readable media of claim 12, wherein the distributed primitives are processed in parallel during a single clock period.

14. The non-transitory computer readable media of claim 13, wherein each primitive includes multiple portions, each portion being associated with a respective one of the vertex processors.

15. The non-transitory computer readable media of claim 12, the method further comprising:
   resolving the draw calls at user specified primitive group boundaries.

16. The non-transitory computer readable media of claim 12, the method further comprising performing primitive generation in the VGT.

* * * * *